Nov. 12, 1968    C. C. SIMONS ET AL    3,409,969

METHOD OF EXPLOSIVELY WELDING TUBES TO TUBE PLATES

Filed June 28, 1965

INVENTORS
Charles C. Simons
& Ronald J. Carlson
BY

United States Patent Office 3,409,969
Patented Nov. 12, 1968

3,409,969
METHOD OF EXPLOSIVELY WELDING
TUBES TO TUBE PLATES
Charles C. Simons, Columbus, and Ronald J. Carlson,
Galloway, Ohio, assignors, by mesne assignments, to
Westinghouse Electric Corporation, Pittsburgh, Pa., a
corporation of Pennsylvania
Filed June 28, 1965, Ser. No. 467,244
15 Claims. (Cl. 29—157.3)

ABSTRACT OF THE DISCLOSURE

A method of explosively welding one or more open-ended metal tubes to a tube plate (for example the tube plate of a heat exchanger), comprising positioning a disc-shaped explosive charge in the tube in a plane substantially flush with the surface of the plate or slightly beyond said plane. The explosive charge is enclosed in a body of material closely fitting the tube and acting as a coupling agent to transmit the detonation forces of the explosive to the tube in a manner to expand the wall of the tube with a high velocity into impinging abutment with the inner wall of the opening to effect an autogenous bond or explosion weld joint.

In so welding a number of tubes to a heat exchanger tube plate, the proximity of the openings for the tubes is so close that the metal ligaments between the openings may be distorted during the explosion welding of adjacent tubes. Accordingly, a further feature of the invention is to provide an explosive having a detonation velocity exceeding 120% of the sonic velocity of the metal in the components (tube and tube plate) having the highest sonic velocity.

---

This invention relates to the autogenous bonding of metals by explosive means, usually termed explosion welding, and has for an object to provide an improved method of explosion welding.

Although explosion welding methods are generally well known to those skilled in the welding art, and although several schemes have been proposed for explosively welding substantially flat plates to each other cladding outer tubes with inner tubular liners, etc., there exists a need for joining tubes to plates.

For example, at present, in the manufacture of heat exchangers having a plurality of heat exchanger tubes received in a tube sheet, each of the tubes is welded to the tube sheet by annular surface weld joints attained by the usual welding methods, such as by the deposition of welding metal. One of the welding methods that has met with some acceptance by those skilled in the art is the TIG (Tungsten Inert Gas) welding process. However, the depth of weld that can be achieved by the TIG and other similar methods is limited. Also, since a great expenditure of time is required to weld by the above methods these methods have met with some disfavor.

As mentioned above, explosion welding of metals is generally known and is characterized by the step of employing a high explosive chemical charge to impinge mating surfaces together at very high velocity and pressure to provide a metallurgical bond or autogenous weld joint without fusion of the metals involved. Some difficulty has been encountered in the explosion welding of tubes to plates, for although some welding of the outer surface of the tube to the inner surface of the associated bore in the plate may have been attained, a significant depth from the surface of the plate has been left unwelded. Also, where tubes are welded to plates containing openings adjacent to the tube weldments, significant and highly undesirable distortion of the adjacent openings can be incurred from the explosive forces released during the explosion welding. Similarly, where a tube has previously been welded in an adjacent opening, the explosive force from subsequent tube welding operations can cause failure of the previous weld joint.

Accordingly, it is a primary object of the invention to provide an improved method of explosively welding the outer surface of a metal tube to the inner surface of an opening in a metal plate.

Another object is to provide a method of explosively welding the outer surface of a metal tube to the inner surface of an opening in a metal plate having adjacent openings, in which distortion of the adjacent openings by the explosive forces is substantially minimized.

A further object is to provide a method of explosively welding the outer surface of a metal tube to the inner surface of an opening in a metal plate, wherein the detonation velocity of the explosive charge and the placement of the charge is so selected that an annular weld extending from the surface of the plate to a substantial depth is attained with the repetitive reliability required in manufacturing.

Briefly, in accordance with the invention, there is provided a method for explosively welding one or more open-ended tubes to a tube plate, comprising the steps of:

(1) Providing a tube plate with an opening extending therethrough for each of the tubes;

(2) Inserting a tube in an associated opening, with the open end substantially flush or extending slightly beyond the surface of the plate and with at least an annular outer surface portion of the tube in slightly annularly spaced relation with the adjacent inner surface of the openings;

(3) Positioning an explosive charge in the tube in juxtaposition with the surface of the plate and preferably in a plane flush with the surface of the plate or slightly beyond said plane;

(4) Imbedding or otherwise enclosing the explosive charge in a body of suitable material effective to act as a coupling agent for transmitting the detonation forces of the explosive to the tube in a manner to expand the wall of the tube with high velocity and to force the same into impinging abutment with the inner wall of the opening;

(5) Initiating detonation of the explosive charge to attain explosive autogenous welding of the tube to the inner wall of the opening in an annular region of substantial depth adjacent the surface of the plate; and (6) Concomitantly explosively shearing away that portion of the tube disposed above the surface of the plate, in the case where the open end of the tube extends beyond the surface of the plate (see Step 2), during the welding step (see Step 5) and by the explosive forces of said charge.

Although not limited thereto, the invention is directed to the explosive welding of tubes made of nickel-chromium-iron alloys, such as Inconel (trademark of International Nickel Company), to tube sheets made of mild steel and having a clad surface layer of nickel-chromium-iron alloy, wherein the tubes are autogenously bonded or welded to the tube sheet for at least the depth of the clad surface layer.

Also, the invention is further directed to the joining of Inconel alloy tubes in an Inconel alloy clad mild tube sheet by an explosive charge detonated in a manner which minimizes distortion of adjacent openings so as to not interfere with subsequent insertion of Inconel alloy tubes in these openings or, alternatively, so as not to result in failure of tube weld joints previously made.

The invention is additionally directed to the aforementioned method of welding, wherein there is little or no distortion or deformation or misalignment of the tubes together with maximum reproducibility of reliable welding joints and minimum post-welding clean-up of coupling material refuse.

The above and other objects are effected by the invention as will be apparent from the following description taken in connection with the accompanying drawings, forming a part of this application, in which.

Figure 1:
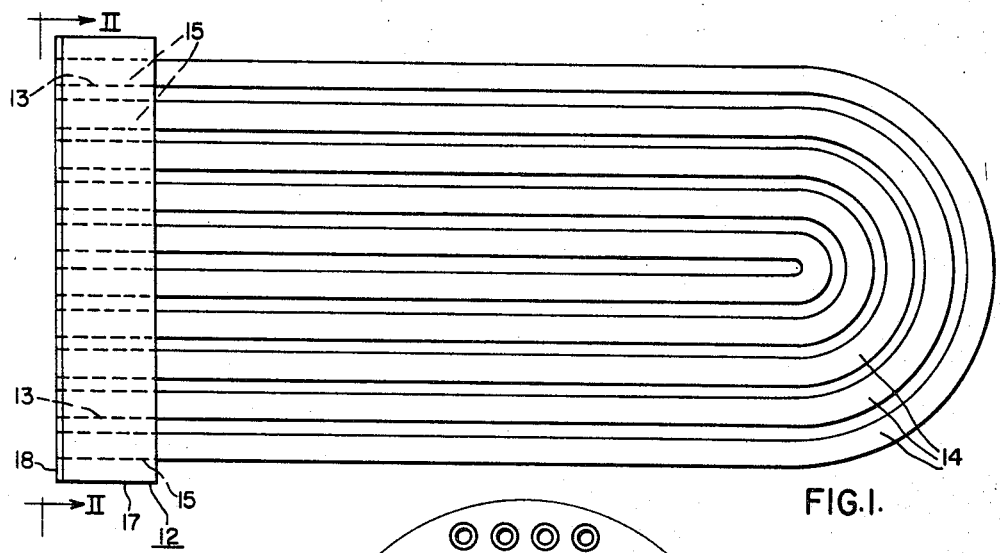
FIG. 1 is a side elevational view of a heat exchanger tube and tube sheet structure welded in accordance with the invention.
Figure 2:
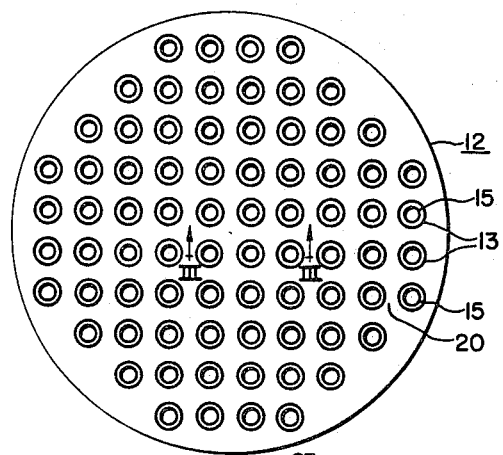
FIG. 2 is an end view taken on line II—II of FIG. 1 and looking in the direction of the arrows.

Referring to the drawings in detail, in FIGS. 1 and 2 there is shown a tube and tube sheet structure, generally designated 10, comprising a disc-shaped tube plate or sheet 12 having a plurality of openings 13 extending completely therethrough and arranged in any suitable pattern, and an equal plurality of open-ended tubes 14 of hairpin shape and having their end portions 15 received in associated openings 13 and welded thereto by explosion welding in accordance with the invention.

The structure 10 is of a well-known type, widely employed in the heat exchanger art for transferring heat by surface heat exchange between two fluids at different temperatures when disposed in a suitable shell structure (not shown) as well-known in the art. When the tube and tube sheet structure is intended for severe service with the utmost reliability and minimization of possible corrosion from the fluid traversing the tubes 14, the tube sheet 12 is formed with a major portion 17 of any suitable mild steel clad with an outer planar surface layer 18 of corrosion-resistant material, such as a nickel-chromium-iron alloy (for example, Inconel alloy). Also, for the same reason, the tubes 14 are formed entirely of the same or similar metal, such as Inconel alloy. By way of example, a typical tube sheet 12 may be of substantial thickness and diameter (e.g., 2 feet and 10 feet, respectively) while the clad layer 18 is relatively thin (e.g., ¼ inch); and the tubes 14 may be somewhat less than 1 inch in diameter (e.g., ⅞ inch).

Since the tube sheet 12 is arranged to accommodate a very large number of tubes 14, a correspondingly large number of openings 13 are provided. Hence the center-to-center spacing between neighboring openings is relatively small (e.g., about 1¼ inches) and the ligament portions 20 between adjacent openings are relatively thin (e.g., about ⅜ inch).

Figure 3:
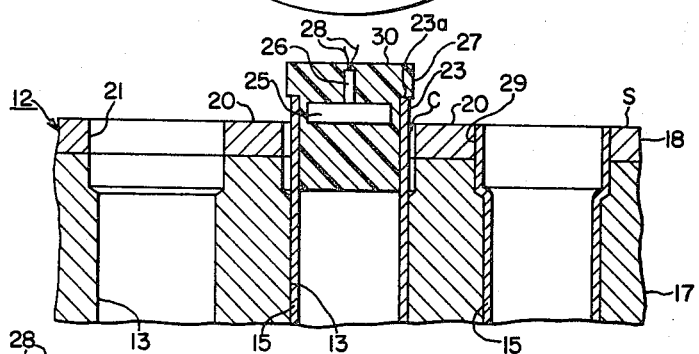
FIG. 3 is an enlarged fragmentary sectional view taken on line III—III of FIG. 2, and illustrating various steps in the weldment preparation as well as a completed weld joint.

FIG. 3 illustrates a portion of the tube sheet 12 including three of the openings 13, wherein the weldment preparation is shown in the center, the completed tube and sheet weldment is shown at the right, and an opening 13 prepared for insertion of a tube is shown at the left.

Referring to FIG. 3, the weldment preparation comprises concentrically counterboring the openings 13 to a slightly larger diameter and to a greater depth than the thickness of the clad surface layer 18, thereby forming an annular wall surface 21 extending inwardly from the surface S of the tube sheet.

Prior to insertion of the end portion 15 of a tube 14 in the opening 13, the inside surface of the opening 13 and the surface 21 of the counterbore as well as the outer surface of the tube portion 15 are degreased by any suitable solvent, for example, methyl-ethylketone. These surfaces are then wire-brushed, for example, by a rotating wire brush, and blown with dry air. The thus cleaned tube-end portion 15 is inserted in the associated opening 13 and its open-end portion 23 is allowed to extend slightly beyond the surface S of the tube sheet.

An explosive charge 25 is then positioned within the tube end portion 15 with a suitable electrical detonation initiator 26 superimposed above the charge 25. The charge 25 and the initiator 26 are fixedly positioned relative to each other and the tube portion 15 by a body 27 of suitable filler material. The initiator 26, as well known in the art, is provided with a pair of lead wires 28 and is fired by connecting the wires 28 to an electrical power supply (not shown), thereby to detonate the explosive charge 25. The explosive force of the charge 25 is effective to rapidly expand that annular portion of the tube end portion 15, across the annular clearance space C encompassed by the counterbore surface 21 into impinging abutment with the counterbore surface 21 to metallurgically unite the two and provide an annular autogenous weld joint 29 extending substantially from the surface S to a region below the clad portion 18 of the tube sheet, as will now be described in detail.

There are several important, though not critical interrelated variables for successfully practicing the invention, namely, the width and depth of the tube-to-wall clearance C, the position of the tube end portion 23, the material forming the body 27 and its proportions, the position of the detonation initiator 26 with respect to the explosive charge 25, and the size, weight, shape, position and detonation velocity of the explosive charge 25.

For simplicity of description and ease of comprehension and not by way of limitation, the above variables will be described in detail in conjunction with the weldment of a specific tube 14 and tube sheet 12, wherein the tube portion 15 is made of Inconel alloy having an external diameter of about ⅞ inch and a wall thickness of about ¹⁄₁₆ inch, and the tube sheet is formed with its major portion 17 of any suitable metal such as mild steel with the clad surface 18 to ¼ inch Inconel alloy. For optimum service reliability, it is desirable to attain the weld joint 29 (FIG 2) for at least the depth of the clad surface 18 (¼ inch).

THE CLEARANCE C

In the above specific example, the optimum radial width of the clearance C ranges from about ¹⁄₁₆ inch to ¹⁄₃₂ inch and the axial depth of the clearance ranges from about ¼ inch to about ½ inch or more. The clearance C may be obtained in any other suitable manner, for example, by swaging or otherwise reducing the diameter of the tube portion 15, thereby obviating the counterbore.

THE BODY 27

The axial depth of the body 27 is preferably at least equal to the depth of the clearance C or about ½ inch and has an upper enlarged end portion 30 extending above the end face 23a of the tube. The body may be formed by casting plastic material such as paraffin, polypropylene, polyethylene, nylon, Kold-Weld (trademark of Precision Dental Mfg. Co.), Epon (trademark of Shell Oil Company), or Adiprene polyurethane rubber (trademark of Du Pont de Nemours Company).

The body 27 serves two purposes. First, it provides a coupling means for efficiently transmitting the energy generated by the detonation of the charge 25 to the tube portion 15. Additionally, it facilitates fixing the location of the charge in a predetermined position with respect to the tube.

Paraffin, Kold-Weld and Epon have been employed and found to disintegrate during the explosion without causing plugging of the tubes or other deleterious effects. However, all of the other plastic materials listed above appear to be highly satisfactory for the body.

THE DETONATION INITIATOR 26

Figure 4:
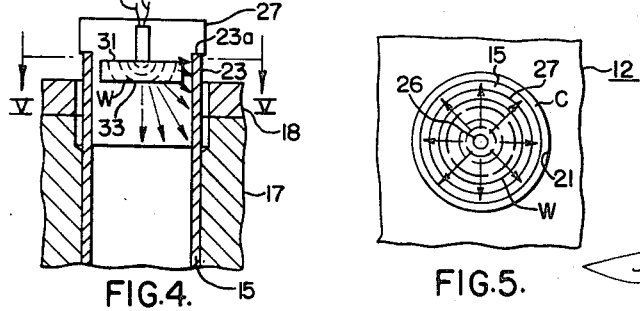
FIG. 4 is a further enlarged axial sectional view, illustrating the weldment preparation.
Figure 5:
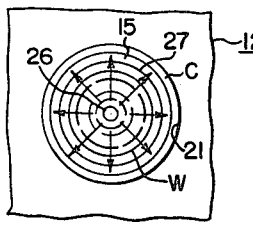
FIG. 5 is a transverse sectional view taken on line V—V of FIG. 4.

The detonation initiator is disposed in the plastic body 27 in an axially-extending position above the upper surface 31 of the charge 25 and in abutment or at least juxtaposition therewith. With this arrangement, detonation of the explosive charge 25 is initiated in the center of the upper surface 31 and the detonation wave W progresses in axially inwardly direction with a hemispherical wave front and the explosive forces thus generated, as indicated by the arrows in FIGS. 4 and 5, extend normal to the wave front W with symmetrical axial and radial components, thereby exerting uniform pressure on the tube wall in all planes normal to the longitudinal axis of the tube portion 15. Hence, the high velocity impingement of the tube wall onto the counterbore surface 21 is substantially uniform, thereby effecting peripheral autogenous welding of the tube to the tube sheet commencing at the upper end of the weld joint 29 and terminating at the lower end of the weld joint.

THE EXPLOSIVE CHARGE 25

The explosive charge 25 may be formed of any high velocity explosive material, such as TNT (trinitrotoluene) or PETN (pentaerythritol tetranitrate) with additional binder or filler material, as required to provide a suitable high detonation velocity. TNT in the pure cast state has a detonation velocity of about 22,000 feet per second. PETN, in the pure state, has a detonation vlocity of about 27,000 feet per second, but is obtainable in thin rubber-like sheet form known as Detasheet (trademark of Du Pont de Nemours Company) having a detonation velocity of about 23,000 to 24,000 feet per second. Both of these explosives have a considerably higher detonating velocity than 120 percent of the sonic velocity of nickel and iron. (Nickel has a sonic velocity of about 16,300 feet per second, while iron has a sonic velocity of about 16,800 feet per second.)

The charge 25 is preferably of disc shape of larger diameter than axial length and may be formed of one or more discs of Detasheet, as required.

The charge location is highly important and, as illustrated, the charge 25 is positioned concentrically in the body 27 and the tube portion 15 in parallel juxtaposition with the planar surface S of the tube sheet. That is, the lower surface or base 33 of the charge is about flush or even with the surface S, with the preponderant mass of the charge above or beyond the surface S. However, excellent results are obtained when the base 33 of the charge is disposed above the surface S of the tube sheet up to about 3/16 inch.

The weight of the charge may vary within a reasonable range with highly satisfactory results. In the weldment preparation example, satisfactory weld joints with minimum distortion of adjacent openings are obtained with a charge weight of from 1.475 grams to 2.065 grams.

The length of the weld joint 29 for explosive charges 25 of varying weight, disposed in paraffin for example, with the base 33 of the charge flush with the tube sheet surface S, as obtained in actual tests, are given below. In these tests the detonation velocity of the charge 25 was at least higher than 120% of the sonic velocity of the metal in the weldment preparation having the highest sonic velocity.

| Weight (gm.) of Charge 25 | Length (in.) of Weld Joint 29 |
|---|---|
| 1.475 | .350 |
| 1.770 | .350 |
| 2.065 | .425 |
| 2.360 | .475 |
| 2.655 | .475 |

The above data was obtained with the tube end portion 23 extending 3/16 inch beyond the tube sheet surface S. This data confirms that the length of the weld joint 29 is increased as the weight of the explosive charge 25 is increased. However, deflection of adjacent ligaments 20, with attendant distortion of adjacent openings 13 and/or rupture of adjacent weld joints can occur when the charge weight is increased above 2.065 grams.

The length of the weld joint 29 obtained with a fixed explosive charge weight of 1.475 grams but with its base 33 at varying distances above the surface S of the tube sheet, is given below:

| Weight (gm.) of Base 33 of Charge Above Surface S | Length (in.) of Weld 29 |
|---|---|
| 1/16 | .352 |
| 1/8 | .250 |
| 3/16 | .200 |

In each of the above cases, the clearance C was maintained at a value of about 1/32 inch and the tube end portion 23 was extended to about 1/4 inch above the tube sheet surface S. No weld joint failures were noted and distortion of adjacent openings 13 was within the range of acceptability, i.e. insufficient to prevent insertion of tubes for welding. The above data confirms that the unique and excellent weld joint quality and depth can be attained with reliability when the base of the charge is substantially flush or slightly above the tube sheet surface S.

To further confirm the above, a series of tests was conducted with the tube end portions 23 extending about 1 inch above the tube sheet surface S, the annular clearance C maintained at 1/64 inch, and the charge 25 maintained at a weight of 1.770 grams. However, the charge was positioned at various depths below the tube sheet surface S and the following results were obtained:

| Distance (in.) of Base 33 of Charge Below Surface S | Distance (in.) From Surface S to Start of Weld Joint | Length (in.) of Weld Joint |
|---|---|---|
| 3/8 | .300 | .030 |
| 1/4 | .125 | .145 |
| 1/8 | .100 | .200 |
| 0 | .034 | .350 |

The above data clearly confirms that, as the base of the charge is positioned further below the tube sheet surface S, the length of the weld joint 29 decreased and the start of the weld joint occurs at an increasing distance below the surface S. In the first instance above, the length of the joint (.030") is insufficient for practical purposes and is undesirable especially in instances where the tube sheet is provided with a clad protective surface having a thickness of less than .300 inch, since the weld joint would be attained below the protective clad layer.

The examples illustrated clearly show that, in accordance with the novel features of the invention, good, reliable autogenous weld joints can be obtained between tubes inserted in apertured plates when an explosive charge of discrete shape is placed in juxtaposition with the surface of the tube plate, that is, with the base of the charge disposed either slightly below the plate surface, flush with the plate surface or slightly above the plate surface.

Also, with the explosive charge so placed, a relatively high detonation velocity of 120 percent (or greater) of the sonic velocity of the metal in the system having the highest sonic velocity can be safely and advantageously employed in cases where the openings in the sheet are closely spaced. Conversely, it has been found that with a lower detonation velocity, a larger charge weight is required to properly perform the tube-to-sheet welding and this, in turn, can cause excessive distortion of adjacent openings and/or possible rupture of completed weld joints where the openings are closely spaced. However, where the openings are further apart and/or distortion of the openings need not be minimized, a lower detonation velocity may be advantageously employed.

In addition, the placement of the charge as explained above provides concomitant, clean explosive shearing away of the excess tube end portion (i.e., the end portion 23 extending above the tube sheet surface S) without the necessity of an additional and final machining operation.

We claim as our invention:

1. The method of explosively welding an open-ended metal tube having a first sonic velocity to a metal plate having a second sonic velocity and having a planar surface, comprising the steps of
    providing a circular opening in said plate extending through said surface,
    inserting said tube in said opening, with the open end in juxtaposition with said planar surface,
    inserting an explosive charge having a detonation velocity of at least 120% of the higher of said first and second sonic velocities and of predetermined shape and size in said tube and adjacent to said planar surface,
    enclosing said charge in a body of plastic material substantially filling a portion of said tube to a predetermined depth from said end portion, and
    detonating said explosive charge to effect welding of an annular portion of the outer surface of said tube to said plate in the region adjacent said planar surface.

2. The method recited in claim 1, and including the step of
    forming said opening in a manner to provide an annular clearance space about the outer surface of the tube in the region adjacent the planar surface.

3. The method recited in claim 1, and including the steps of
    positioning the tube with its open-end portion beyond the planar surface of the plate,
    positioning the explosive charge in such a manner that the preponderant mass of the charge is beyond the planar surface, and
    explosively severing the end portion of the tube substantially concomitantly with the attainment of the welding by the explosive forces of the charge.

4. The method of explosively welding an open-ended cylindrical metal tube having a first sonic velocity to a metal plate having a second sonic velocity and having a planar surface, comprising the steps of
    providing a bore in said plate having a diameter at least as great as that of said tube and extending through said surface,
    providing an annular clearance between said bore and said tube extending from said surface to a predetermined depth,
    inserting said tube in said bore with the open end extending beyond said surface and with a portion of said tube in spaced relation with said bore,
    embedding a disc-shaped explosive charge having a detonation velocity of at least 120% of the higher of said first and second sonic velocities in a body of plastic material in such a manner that the charge is positioned in said tube adjacent to said planar surface, and
    detonating said charge in such a manner that the resulting detonation wave is directly substantially in a direction away from the open end of said tube and effects welding of an annular portion of the tube to the plate in the annular region surrounding said counterbore.

5. The method recited in claim 4, and further including the steps of
    explosively severing the open end portion of the tube substantially flush with the planar surface during the detonation of the charge.

6. The method recited in claim 4, wherein
    the diameter of the disc-shaped charge is greater than its axial thickness.

7. The method of explosively welding a bundle of open-ended metal heat exchanger tubes having a first sonic velocity to a metal heat exchanger tube sheet having a second sonic velocity and having a surface comprising the steps of
    providing a plurality of bores in said tube sheet in a predetermined pattern with ligaments between adjacent bores of less width than the diameter of said bores,
    inserting said tubes in said bores with the open ends of the tubes at least flush with said surface,
    inserting an explosive charge having a detonation velocity of at least 120% of the higher of said first and second sonic velocities and of predetermined size and shape and surrounded by a body of plastic material in each of said tubes and adjacent to said tube sheet surface, and
    detonating said charges in such a manner that the resulting detonation wave is directed away from the open ends of the tubes and inwardly of the tubes with resulting welding of the tubes to the tube sheet.

8. The method recited in claim 7 and further including the steps of
    forming the bores with a slightly larger diameter than the associated tubes for a predetermined depth, thereby to provide an annular clearance space therebetween, and
    effecting welding of an annular portion of the tubes to the plate in the annular region surrounding said spaces by rapid expansion of said annular portions, and without substantial deformation of adjacent bores and without damage to adjacent tube welds.

9. The method recited in claim 7, wherein
    the open end portions of the tubes project beyond the tube plate surface, and
    further including the steps of explosively severing the projecting end portions substantially flush with the tube plate surface during detonation of the explosive charges.

10. The method of explosively welding an open-ended metal tube to a metal plate having a planar surface comprising the steps of
    providing a circular opening in said plate extending through said surface,
    inserting said tube in said opening and positioning said tube with the open end beyond said planar surface,
    inserting an explosive charge of predetermined shape and size in said tube with the preponderant mass of the charge beyond said planar surface,
    enclosing said charge in a body of plastic material substantially filling a portion of said tube to a predetermined depth from said end portion, and
    welding of an annular portion of the outer surface of said tube to said plate in the region adjacent said planar surface and concomitantly severing the end portion of the tube by detonating said explosive charge.

11. The method recited in claim 10, and including the step of
    forming said opening in a manner to provide an annular clearance space about the outer surface of the tube in the region adjacent the planar surface.

12. The method of explosively welding an open-ended cylindrical metal tube to a metal plate having a planar surface, comprising the steps of
    providing a bore in said plate having a diameter at least as great as that of said tube and extending through said surface,
    providing an annular clearance between said bore and said tube extending from said surface to a predetermined depth,
    inserting said tube in said bore with the open end extending beyond said surface and with a portion of said tube in spaced relation with said bore,
    embedding a disc-shaped explosive charge in a body of plastic material in such a manner that the charge is positioned in said tube in juxtaposition with said planar surface, and welding an annular portion of the tube to the plate in the annular region surrounding said counterbore by detonating said charge in such a manner that the resulting detonation wave is directed substantially in a direction away from the open end of said tube, and explosively severing the open end portion of the tube substantially flush with the planar surface during the detonation of the charge.

13. The method recited in claim 12, wherein
the diameter of the disc-shaped charge is greater than its axial thickness.

14. The method of explosively welding a bundle of open-ended meal heat exchanger tubes to a metal heat exchanger tube sheet having a surface comprising the steps of providing a plurality of bores in said tube sheet in a predetermined pattern with ligaments between adjacent bores of less width than the diameter of said bores, forming the bores with a slightly larger diameter than the associated tubes for a predetermined depth, thereby to provide an annular clearance space therebetween, inserting said tubes in said bores with the open ends of the tubes at least flush with said surface, inserting an explosive charge of predetermined size and shape and surrounded by a body of plastic material in each of said tubes and in juxtaposition with said tube sheet surface, and welding an annular portion of the tubes to the plate in the annular region surrounding said spaces by rapid expansion of said annular portions, and without substantial deformation of adjacent bores and without damage to adjacent tube welds, by detonating said charges in such a manner that the resulting detonation wave is directed away from the open ends of the tubes and inwardly of the tubes.

15. The method recited in claim 14, wherein
the open end portions of the tubes project beyond the tube plate surface, and further including the steps of explosively severing the projecting end portions substantially flush with the tube plate surface during detonation of the explosive charges.

References Cited

UNITED STATES PATENTS

| | | | |
|---|---|---|---|
| 3,131,467 | 5/1964 | Thaller et al. | 29—421 |
| 3,263,323 | 8/1966 | Maher et al. | 29—470 |
| 3,292,253 | 12/1966 | Rossner et al. | 29—470.1 X |
| 3,364,562 | 1/1968 | Armstrong | 29—421 X |
| 2,412,886 | 12/1946 | Huston et al. | |
| 2,779,279 | 1/1957 | Maiwurn. | |
| 3,036,374 | 5/1962 | Williams. | |
| 3,131,661 | 5/1964 | Granberg. | |
| 3,137,937 | 6/1964 | Cowan et al. | |
| 3,140,537 | 7/1964 | Popoff. | |
| 3,140,539 | 7/1964 | Holtzman. | |
| 3,182,392 | 5/1965 | Neal et al. | |

FOREIGN PATENTS

| | | |
|---|---|---|
| 766,741 | 1/1957 | Great Britain. |

JOHN F. CAMPBELL, *Primary Examiner.*

PAUL M. COHEN, *Assistant Examiner.*